United States Patent [19]

Matros et al.

[11] Patent Number: 5,366,708
[45] Date of Patent: Nov. 22, 1994

[54] PROCESS FOR CATALYTIC REACTION OF GASES

[75] Inventors: Yurii S. Matros, St. Louis; Robert A. Yeo, Ballwin; David E. McCombs, Chesterfield, all of Mo.

[73] Assignee: Monsanto Eviro-Chem Systems, Inc., St. Louis, Mo.

[21] Appl. No.: 997,597

[22] Filed: Dec. 28, 1992

[51] Int. Cl.$^5$ ............................................. B01D 53/00
[52] U.S. Cl. ............................ 423/210; 423/245.3; 423/246; 423/239.1; 423/576; 423/244.09; 422/173; 422/180; 422/198
[58] Field of Search ............... 423/210, 243.03, 245.3, 423/245.1, 246, 239, 576, 239.1, 244.09; 422/173, 180, 198

[56] References Cited

U.S. PATENT DOCUMENTS

| | | | |
|---|---|---|---|
| 2,121,733 | 6/1938 | Cottrell | 183/8 |
| 3,988,423 | 10/1976 | Ohrui et al. | 423/236 |
| 4,130,575 | 12/1978 | Jorn | 260/449 |
| 4,248,841 | 2/1981 | Benedick | 423/210 |
| 4,267,152 | 5/1981 | Benedick | 422/111 |
| 4,278,639 | 7/1981 | Tadokoro et al. | 422/171 |
| 4,323,542 | 4/1982 | Joy, III | 423/213.5 |
| 4,426,360 | 1/1984 | Benedick | 422/173 |
| 4,454,826 | 6/1984 | Benedick | 422/175 |
| 4,478,808 | 10/1984 | Matros et al. | 423/522 |
| 4,741,690 | 5/1988 | Heed | 122/4 D |
| 4,834,962 | 5/1989 | Ludwig | 423/351 |
| 4,877,592 | 10/1989 | Matros et al. | 423/245 |
| 5,016,547 | 5/1991 | Thomason | 110/211 |
| 5,061,464 | 10/1991 | Cordonna, Jr. et al. | 423/213.5 |

FOREIGN PATENT DOCUMENTS

| | | |
|---|---|---|
| 0365262 | 4/1990 | European Pat. Off. |
| 1478419 | 6/1977 | United Kingdom |

OTHER PUBLICATIONS

"Complete Catalytic Oxidation of Volatile Organics" by James J. Spivey Ind. Eng. Chem. Res. 1987, 26, pp. 2165–2180.

*Primary Examiner*—Gary P. Straub
*Assistant Examiner*—Timothy C. Vanoy
*Attorney, Agent, or Firm*—Senniger, Powers, Leavitt & Roedel

[57] ABSTRACT

Apparatus and process for the catalytic gaseous phase reaction of a feed gas mixture. The apparatus includes a reactor having two ends which alternately serve as an inlet for the feed gas mixture and as an outlet for reacted gas and two stationary heat exchange/reaction zones connected by a center zone. Each of the heat exchange/reaction zones contains a layer of catalyst and the center zone contains a feed gas mixture inlet. A first distribution/collection zone is between one of the heat exchange/reaction zones and one of the ends of the reactor and a second distribution/collection zone is between the other heat exchange/reaction zone and the other end of the reactor. In the process, the heat exchange/reaction zones are alternately heated and cooled by periodically reversing the direction of flow of gas through the reactor. As an intermediate step in each complete reversal of the direction of flow of gas through the reactor, the feed gas is introduced into the center zone and reacted in the heat exchange/reaction zone which was being heated immediately prior to the intermediate step, reacted gas is discharged from the end of the reactor which served as the reacted gas outlet immediately prior to the intermediate step, unreacted feed gas trapped in the distribution/collection zone between the heat exchange/reaction zone which was being cooled and the end of the reactor which served as the feed gas inlet immediately prior to the intermediate step is displaced to the center zone, and the displaced unreacted gas is combined with feed gas mixture being introduced into the reactor.

18 Claims, 6 Drawing Sheets

PROCESS FOR CATALYTIC REACTION OF GASES

SUMMARY OF THE INVENTION

The present invention relates to a process for the catalytic reaction of a feed gas mixture in a reactor having two stationary regenerative heat exchange/reaction zones.

In U.S. Pat. No. 4,478,808, Matros et al. disclose a process and apparatus for preparing sulphur trioxide by the oxidation of sulphur dioxide. The apparatus consists of a reactor having a stationary catalyst bed interposed between two layers of inert material. The sulphur dioxide is passed through and is heated by the first layer of inert material, oxidized to sulphur trioxide in the catalyst bed, and then passed through the second layer of inert material before being discharged from the apparatus. Heat liberated during oxidation is transferred to the second layer of inert material. Periodically, the direction of flow of the incoming sulphur dioxide and the outgoing sulphur trioxide through the catalyst bed are reversed.

In U.S. Pat. No. 4,877,592, Matros et al. disclose a similar process for the catalytic cleaning of waste gases containing VOCs or carbon monoxide at 250° C. to 700° C. by passing the waste gas through a catalyst bed and periodically reversing the direction of flow. To promote more uniform heating of the catalyst and avoid overheating, the waste gas is passed through a first part of the catalyst bed, stirred and passed through a second part of the catalyst bed.

Each time the direction of flow is reversed from an ascending to a descending direction (and from a descending to an ascending direction) in the processes disclosed in the two Matros et al. patents, however, unreacted gas in the space below the catalyst bed is discharged in an unreacted state. Such discharge reduces the degree of reaction by an amount corresponding to the volume of discharged unreacted gas relative to the amount of gas flowing through the apparatus between each reversal.

In U.S. Pat. No. 4,248,841, Benedick discloses an incineration system for industrial effluents which avoids the discharge of unreacted gas. This incineration system has a central, high temperature oxidation chamber having a burner located toward the bottom thereof with which six heat-exchanger sections communicate. At any one time, two of the heat exchanger sections are being purged, two are used to preheat the industrial effluent and the remaining two are being heated by combusted gas exiting the system. In each successive cycle, the heat-exchange sections which were heated by the combusted gas are used to preheat the effluent, the heat-exchange sections which were used to preheat the effluent are purged of unpurified effluent, and the combusted gas is exhausted through a previously cooled heat exchange section. A disadvantage of this approach, however, is the increased cost, complexity and bulk associated with an increased number of heat exchange sections and valves.

EPO Publication No. 0 365 262 discloses a method for continuous combustion of gaseous contaminants in which the gas to be purified flows through two heat exchange zones and a combustion chamber intermediate of the two zones and in which the direction of flow is changed periodically. At the beginning of each period the purified gas stream is divided into two part-streams in the combustion chamber to reduce the discharge of unpurified contaminants. One of the part-streams is directly discharged from the combustion chamber to a recipient whereas the other is passed though the heat exchange zone being heated and from there recycled and combined with unpurified gas being passed to the heat exchange zone being cooled. The discharge of the hot part-stream from the combustion chamber to the recipient, however, results in a heat loss from the system which would not be advantageous for energy-lean mixtures or endothermic reactions.

Among the objects of the invention, therefore, may be noted the provision of an apparatus and a process for the catalytic gaseous phase reaction of a reactive feed gas mixture in a reactor having two stationary regenerative heat exchange/reaction zones; the provision of such an apparatus and a process in which the discharge of unreacted gas is avoided; the provision of such an apparatus and a process in which hot gases are not discharged from the combustion zone of the reactor; the provision of such an apparatus and a process in which the feed gas mixture may be reacted to a high degree; and the provision of such an apparatus and a process in which dilute feed gas mixtures may be used.

Briefly, therefore, the present invention is directed to an apparatus for the catalytic gaseous phase reaction of a feed gas mixture. The apparatus comprises a reactor having two ends which alternately serve as an inlet for the feed gas mixture and as an outlet for reacted gas. The reactor additionally has two stationary heat exchange/reaction zones connected by a center zone. Each of the heat exchange/reaction zones contains a layer of catalyst and the center zone contains a feed gas mixture inlet. A first distribution/collection zone is between one of the heat exchange/reaction zones and one of the ends of the reactor and a second distribution/collection zone is between the other heat exchange/reaction zone and the other end of the reactor.

The present invention is additionally directed to a process for the catalytic gaseous phase reaction of a feed gas mixture. In the process, the heat exchange/reaction zones are alternately heated and cooled by periodically reversing the direction of flow of gas through the reactor. As an intermediate step in each reversal of the flow of gas through the reactor, feed gas is introduced into the center zone, reacted gas is discharged from the end of the reactor which served as the reacted gas outlet, unreacted feed gas is displaced from the distribution/collection zone between the heat exchange/reaction zone which was being cooled and the end of the reactor which served as the feed gas inlet, and the displaced gas is combined with feed gas mixture introduced into the center zone.

DETAILED DESCRIPTION OF THE PREFERRED EMBODIMENTS

In accordance with the present invention, an apparatus and process for the catalytic reaction of a feed gas in which the discharge of unreacted gas is minimized and in which hot gases are not discharged from the center zone of the reactor has been discovered. Advantageously, dilute feed gas mixtures can be used and the feed gas mixture can be reacted to a high degree.

A variety of feed gas mixtures may be reacted in accordance with the process of the present invention. For example, the feed gas mixture may be an industrial or ventilation gas containing oxygen and a volatile organic compound or carbon monoxide (as described in U.S. Pat. No. 4,877,592), a sulphur dioxide and oxygen mixture (for the production of sulphur trioxide as described in U.S. Pat. No. 4,478,808), hydrogen and carbon oxides (for the production of methanol as described in U.S. Pat. No. 4,130,575), ammonia and $NO_X$ (for the reduction of nitrous oxides), $H_2S$ and $SO_2$ (for the production of sulfur), methane and water (for the production of CO and $H_2$) and $H_2$ and $N_2$ (for the production of ammonia) as described in Matros, *Catalytic Process under Unsteady-State*, (Elsevier Science Publishers, Amsterdam, Netherlands 1989) or other suitable gaseous mixtures which can be reacted in the presence of a catalyst.

The process of the present invention may be used in connection with endothermic and exothermic reactions. If the reaction is endothermic or if the feed mixture contains insufficient combustible content, a hydrocarbon fuel may be mixed with oxygen and the feed gas mixture or an additional source of heat such as an electrical or gas heater may be used indirectly to sustain the temperature in the reaction zone. Process temperatures will typically be between about 150° C. and 700° C. Heating of many catalysts to temperatures greater than about 550° C., however, may undesirably shorten their service life.

Figure 1A:
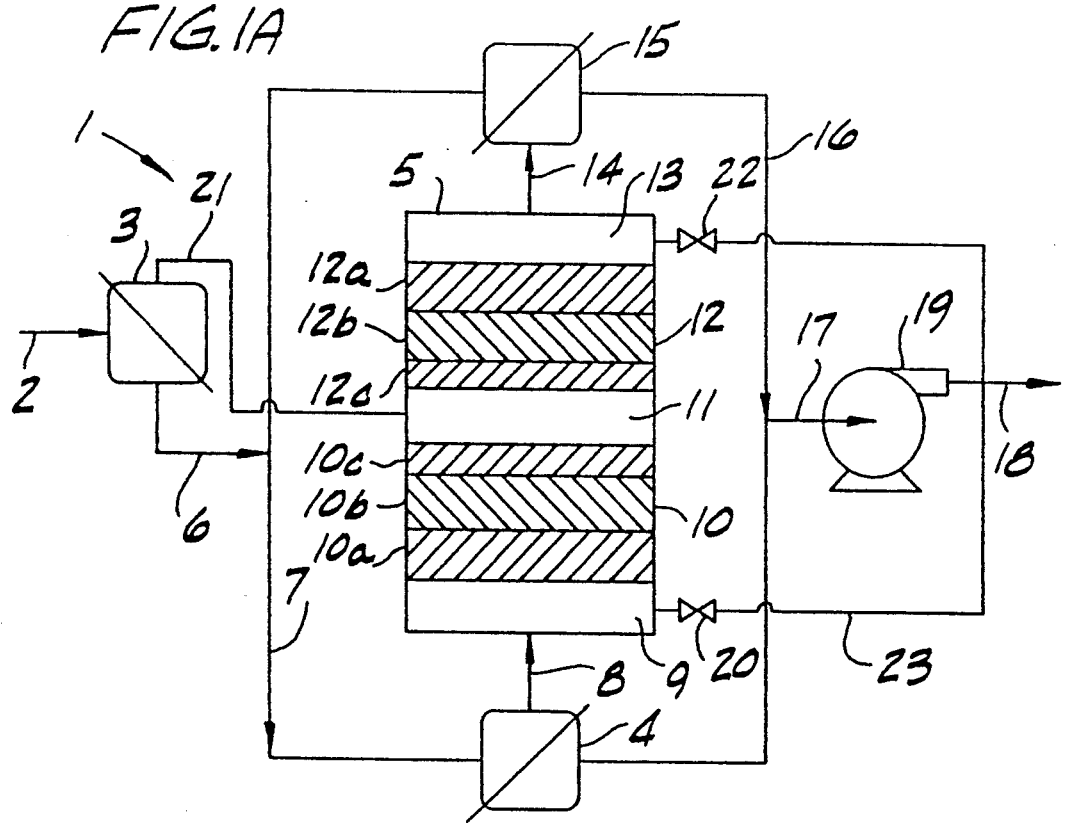
FIGS. 1A–1F schematically show a first embodiment of the process and apparatus of the present invention.

Referring now to FIGS. 1A to 1F, six phases of one cycle of the process of the present invention are schematically depicted. In FIG. 1A, feed gas mixture enters the apparatus for catalytic gaseous phase reaction, generally designated by the numeral 1, via supply line 2. Three-way valves 3 and 4 allow feed gas mixture to enter reactor 5 via lines 2, 6, 7, and 8 with the direction of flow being as indicated. Distribution/collection zone 9 promotes a relatively uniform flow of feed gas mixture through heat exchange/reaction zone 10. Upon entering heat exchange reaction zone 10, feed gas mixture is heated by heat exchange material layer 10a and substantially reacted in catalyst layer 10b. The reacted gas passes through heat exchange material layer 10c and center zone 11 and then enters heat exchange/reaction zone 12 which contains catalyst layer 12b between heat exchange material layers 12a and 12c. The reacted gas may be further reacted in catalyst layer 12b and transfers its heat to heat exchange layer 12a. The reacted gas exits heat exchange zone 12, is collected in distribution/collection zone 13 and enters line 14. Valve 15 allows reacted gas to be delivered to a recipient such as a storage vessel or a stack (not shown) via lines 16, 17, and 18 and blower 19.

Figure 1B:
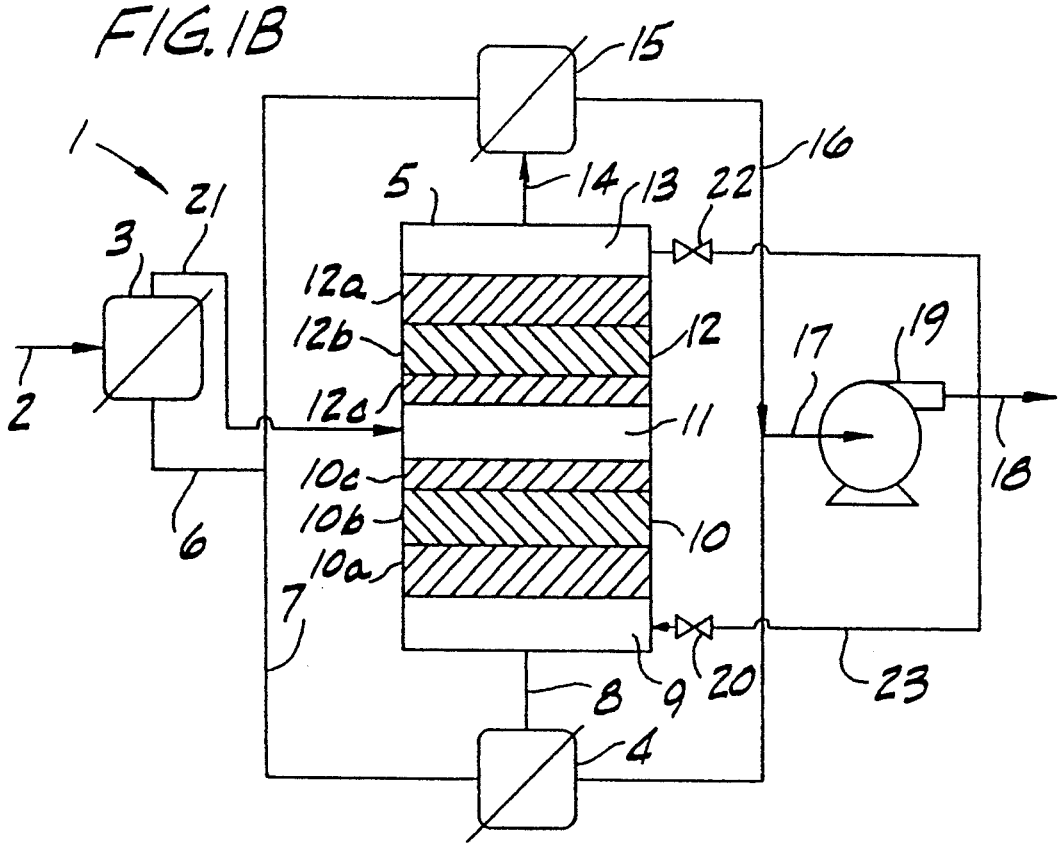
Figure 1C:
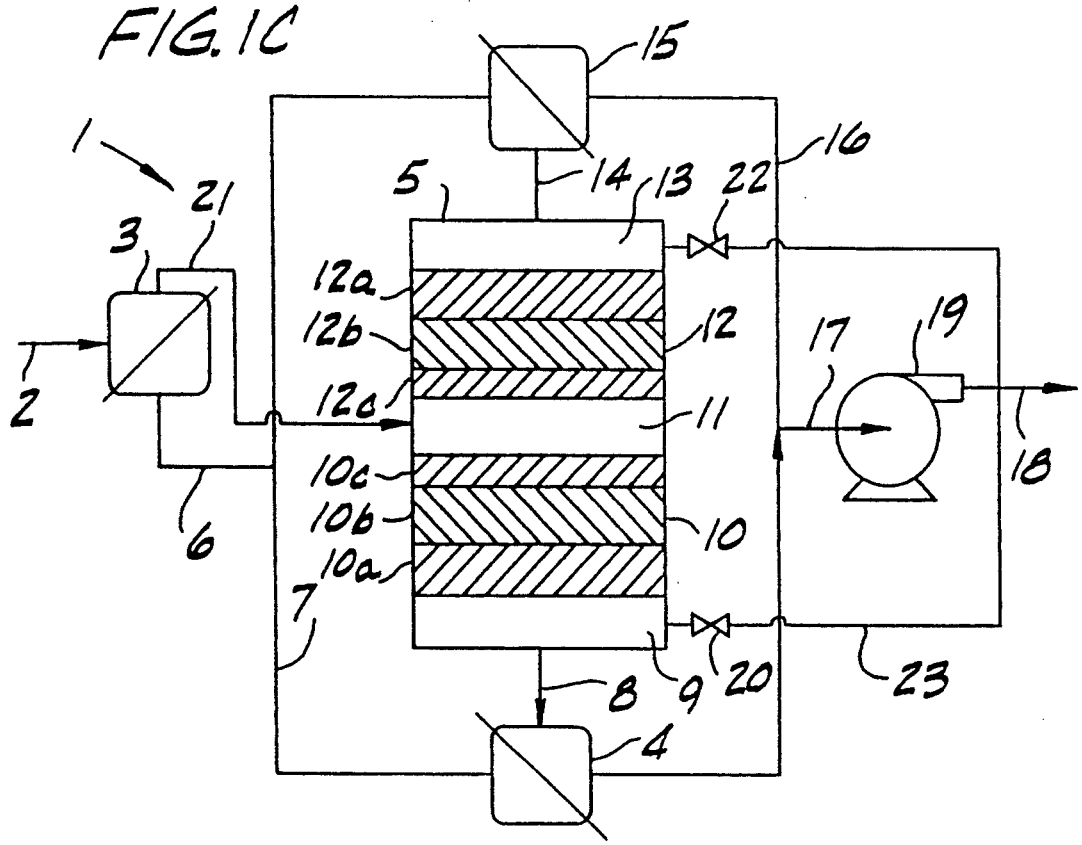
Figure 1D:
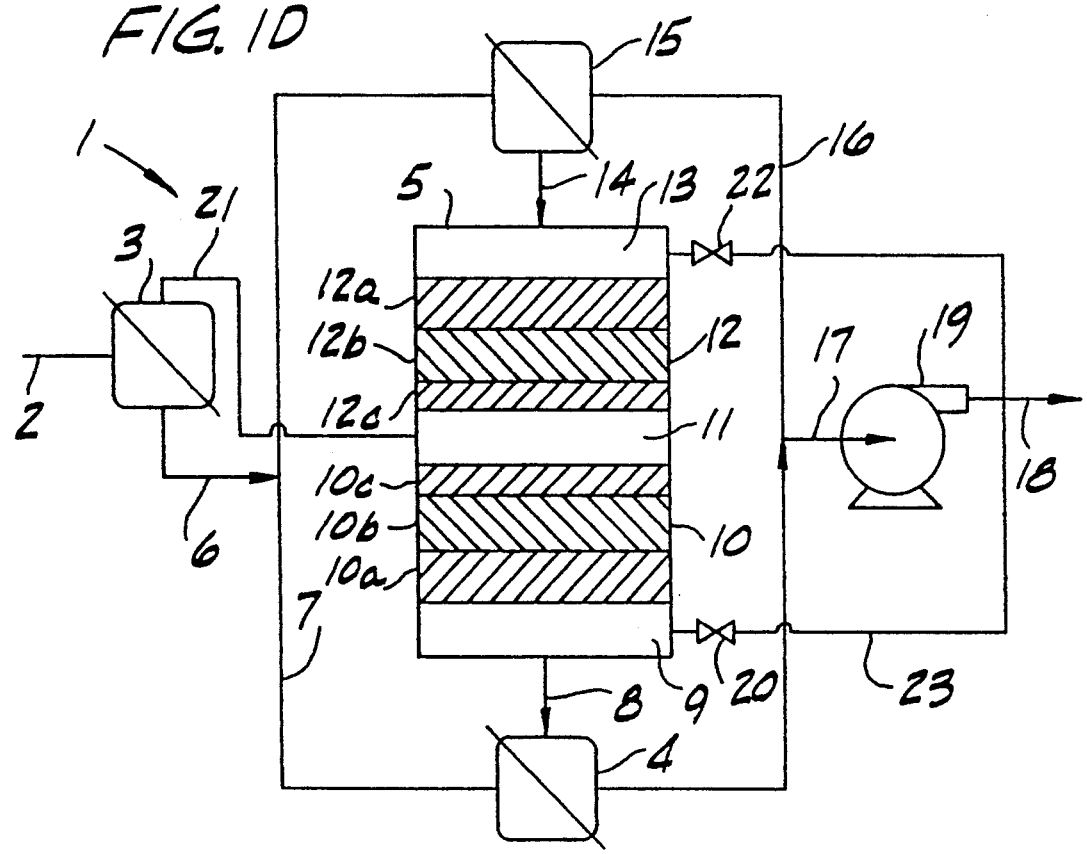

After heat exchange material 10a is cooled to a preselected temperature, heat exchange material 12a is heated to a preselected temperature, or a prescribed period of time elapses, the direction of flow of gas through the reactor is reversed. An intermediate displacement step is required, however, to achieve reversal without discharging unreacted feed gas mixture to the recipient. As depicted in FIG. 1B, feed gas mixture is introduced into center zone 11 via line 21 and three-way valve 3, heated by heat exchange material 12c, and reacted in catalyst layer 12b. The reacted gas transfers its heat to heat exchange layer 12a and is delivered to line 18 via lines 14, 16, and 17, valve 15 and blower 19. Simultaneously with the introduction of feed gas mixture into center zone 11, valve 20 is opened to allow a fraction of the flow of reacted gas in line 18 to be diverted to reactor 5 via line 23. The diverted reacted gas displaces feed gas occupying distribution/collection zone 9, directing the displaced gas through heat exchange layer 10a, catalyst layer 10b and heat exchange layer 10c and into center zone 11 where it is combined with feed gas mixture entering center zone 11 via line 21. At this point, distribution/collection zone 9 is purged of unreacted feed gas; reacted gas occupies both distribution/collection zones 9 and 13 and the flow of feed gas mixture through the reaction zone can be reversed without discharging unreacted feed gas mixture to the recipient.

In the third phase (FIG. 1C), valve 20 is closed and three-way valves 4 and 15 are positioned to allow feed gas to enter center zone 11 and flow in the opposite direction relative to the first phase (FIG. 1A). The feed gas mixture enters heat exchange/reaction zone 10 and is heated and reacted therein. Reacted gas is delivered to a recipient (not shown) via lines 8, 16, 17 and 18 and blower 19. Because the feed gas mixture does not flow in the same direction through both heat exchange/reaction zones, however, the flow is only partially reversed relative to the first phase. This third phase of the process prevents unreacted feed gas mixture from by-passing reactor 5 and being delivered to the recipient during the simultaneous stroking of three-way valves 3, 4 and 15. Although this third phase is preferred, it is not critical.

In the fourth phase (FIG. 1D), three-way valve 3 is positioned to allow feed gas mixture to pass through line 6 thereby completing the reversal of the flow of gas relative to the first phase of the process as depicted in FIG. 1A. That is, feed gas mixture enters the reactor via line 14, passes through both heat exchange/reaction zones and reacted gas exits the reactor via line 8.

Figure 1E:
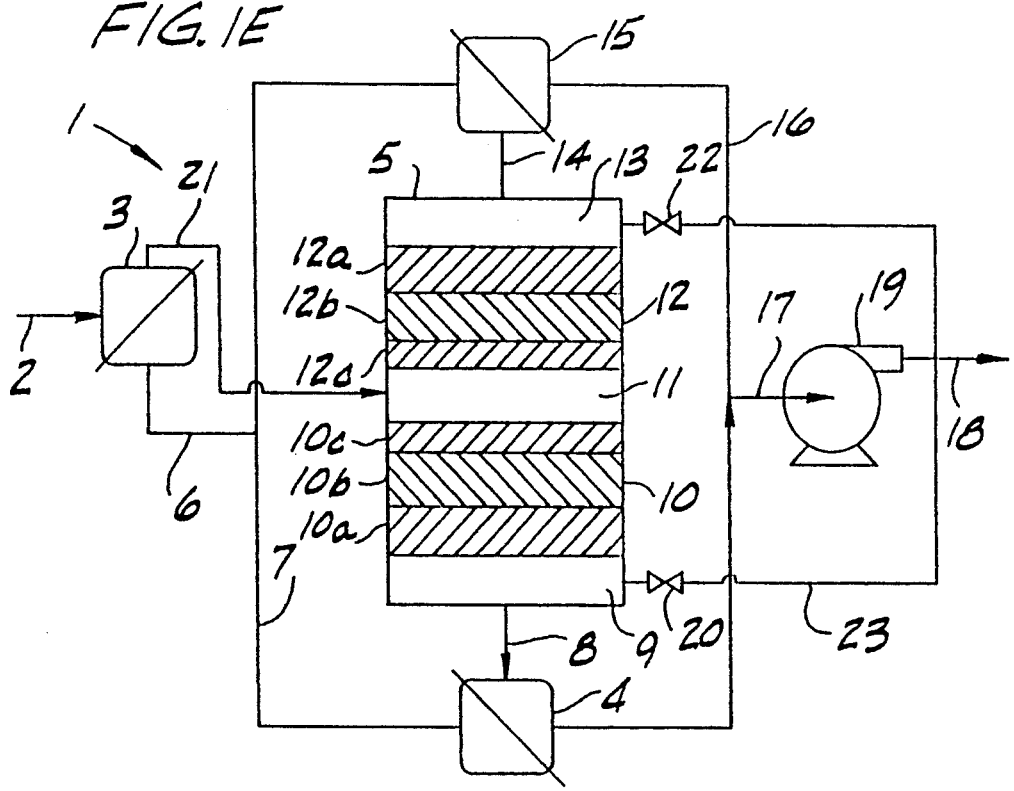
Figure 1F:
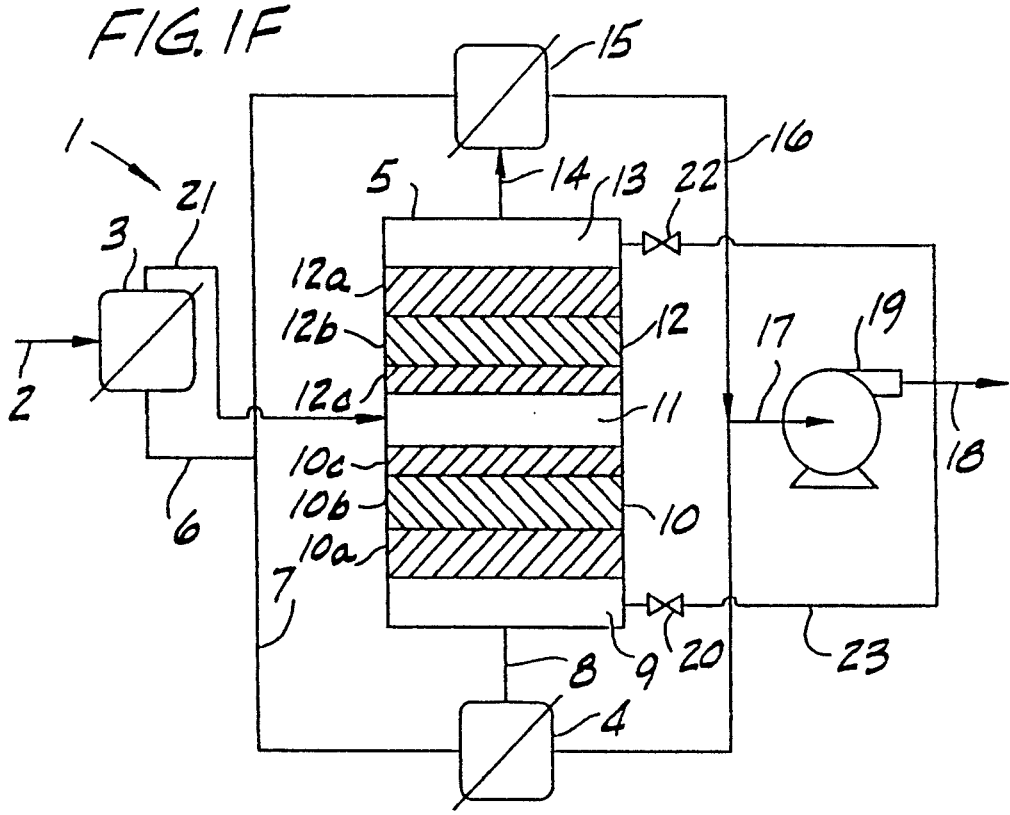

After heat exchange material 12a is cooled to a preselected temperature, heat exchange material 10a is heated to a preselected temperature, or a prescribed period of time elapses, the direction of flow of gas through the reactor is again reversed in the fifth phase (FIG. 1E). Three-way valve 3 is positioned to allow feed gas mixture to enter center zone 11 and valve 22 allows a fraction of the flow of reacted gas in line 18 to be diverted to reactor 5 via line 23. Diverted reacted gas displaces unreacted feed gas mixture occupying distribution/collection zone 13, directing the displaced gas through heat exchange/reaction zone 12 and to center zone 11 where it is combined with feed gas mixture entering center zone 11 via line 21. At this point, distribution/collection zone 13 is purged of unreacted feed gas; reacted gas occupies both distribution/collection zones 9 and 13 and the flow of feed gas mixture through the reaction zone can be reversed without discharging unreacted feed gas mixture to the recipient.

In the sixth and final phase (FIG. 1F), three-way valves 4 and 15 and valve 22 are positioned to allow feed gas mixture from line 21 to enter heat exchange/reaction zone 12 and after reaction, to be delivered to the recipient via lines 14, 16, 17 and 18. This sixth phase of the process prevents unreacted feed gas mixture from by-passing reactor 5 and being delivered to the recipient during the simultaneous stroking of three-way valves 3, 4 and 15. Like the third phase, this sixth phase is preferred, but not critical.

Repositioning three-way valve 3 to divert feed gas mixture from line 21 to line 6 (relative to the sixth phase) begins a new cycle of the process.

The position of the valves in each of the six phases of the process described above are summarized in Table I. "Valve time" as used in Table I and the succeeding tables means the amount of time for mechanical repositioning of the valve plate from one position to another to divert the flow of gas.

rocks or pebbles and have any desired shape such as saddles, spheres, cylinders and Rachig rings.

The catalyst should also be capable of withstanding process temperatures and pressures. Desirably, most impurities will not chemically bond to the catalyst surface. Typical noble metal catalysts such as platinum and paladium offer lower operating temperature and may be preferred in some circumstances. Metal oxides can be used in selected applications.

The apparatus for catalytic gaseous phase reaction 1 illustrated in FIG. 1A through 1F comprises three-way valves 3, 4 and 15. Valves of this type are commercially available from Reverse Process Company (Novosibirsk, Russia). Alternative three-way flanged ball valves are commercially available from Neles-Jamesbury (Worcester, Mass.), but these alternative presently available valves are limited in gas-handling capacity.

TABLE I

| PHASE | DESCRIPTION | VALVE NO | | | | | TIME |
| --- | --- | --- | --- | --- | --- | --- | --- |
| | | 3 | 4 | 15 | 20 | 22 | |
| 1 | Up Flow of Gas/no Purge | 0-6 | U | R | C | C | 2-30 min (typical) |
| 2 | Center Flow Up with Purge | 0-21 | U | R | O | C | 1-50% of phase 1 |
| 3 | Center Flow Down/no Purge | 0-21 | R | U | C | C | Valve Time +0.25 Sec. |
| 4 | Down Flow of Gas/no Purge | 0-6 | R | U | C | C | 2-30 min (typical) |
| 5 | Center Flow Down with Purge | 0-21 | R | U | C | O | 1-50% of phase 4 |
| 6 | Center Flow Up/no Purge | 0-21 | U | R | C | C | Valve Time +0.25 Sec. |

0-6: Open to line 6
0-21: Open to line 21
U: Open on unreacted gas side
R: Open on reacted gas side
O: Open
C: Closed The amount of time required for one complete cycle of the process of the present invention varies depending upon the nature of the reaction. In general, however, a cycle will consume between about 0.8 and about 100 minutes, with cycle times of approximately 3 to 60 minutes being typical. Optimally, a substantial fraction, that is, at least about 95%, of the time required for a cycle will be devoted to phases 1 and 4 of the process (see FIG. 1A and FIG. 1D). Thus, the intermediate steps preferably require no more than about 5% of the time required for a cycle. Also, it is desirable that the flow rate of gas diverted back to reactor 5 via line 23 during phases 2 and 5 of the cycle be less than about 50%, preferably about 15-25%, of the flow rate of feed gas mixture entering reactor 5.

As illustrated in FIGS. 1A through 1F, heat exchange/reaction zones 10 and 12 each comprise a layer of catalyst between two layers of inert heat exchange material. Heat exchange material layers 10c and 12c serve to prevent rapid cooling of the catalyst when feed gas mixture is introduced to center zone 11 and rapid reheating of the catalyst layer after the direction of flow is completely reversed in each cycle of the process. Nevertheless, one or both layers of inert heat exchange material may be replaced with catalyst such that the heat exchange/reaction zone contains catalyst and only one layer of heat exchange material or no inert heat exchange material.

Inert heat exchange materials, when employed, should be capable of withstanding process temperatures and pressures, be inert, preferably have a size between about 0.5 and 2 cm, and have an average heat capacity greater than 0.15 cal/gram° C., preferably greater than 0.2 cal/gram° C. Suitable heat exchange materials include ceramics such as $SiO_2$ and $Al_2O_3$, stoneware and The remaining components of the apparatus of the present invention are also well known to those of ordinary skill and are commercially available. For instance, reactor 5 may be a cylindrical vessel having flat or dished heads, ports at the two ends thereof which alternately serve as an inlet for the feed gas mixture and as an outlet for reacted gas, and grids for supporting the heat exchange/reaction zones.

As illustrated in FIGS. 1A-1F, heat exchange/reaction zones 10 and 12 are in vertical relationship and the feed gas mixture flows in a vertical direction through the heat exchange/reaction zones (up or down depending upon the half-cycle). Alternatively, the heat exchange/reaction zones could be side-by-side and the flow of feed gas mixture could be horizontal through the heat exchange/reaction zones (in the "left" or "right" direction depending upon the half-cycle). In a further alternative, the heat exchange/reaction zones could be side-by-side and the flow of feed gas mixture could be vertical through the heat exchange/reaction zones (up through one zone and down through the other with the direction being alternated in the half-cycles). In each of these alternative geometries and others which may be contemplated, however, there will always be an area between the two heat exchange/reaction zones into which feed gas mixture is introduced as an intermediate step in the reversal of the flow of gas and this area shall constitute the center zone as otherwise described herein.

Figure 2:
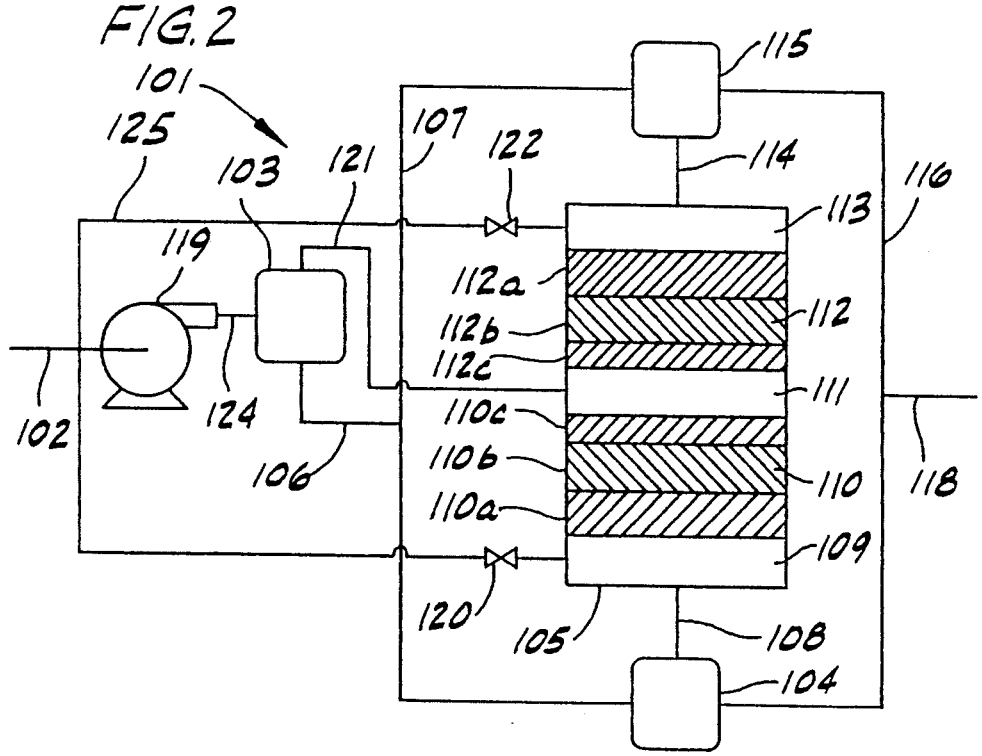
FIG. 2 schematically depicts a first alternative embodiment of the apparatus of the present invention.

A first alternative embodiment of an apparatus and a first phase of the process of the present invention is schematically depicted in FIG. 2. Incoming feed gas mixture is delivered by blower 119 and three-way valve 103 to reactor 105 via lines 102, 124, 106, 107, and 108. After passing through distribution/collection zones 109 and 113, center zone 111 and heat exchange/reaction zones 110 and 112, reacted gas is directed to a recipient (not shown) via lines 114, 116 and 118 and valve 115.

In the second phase of the process cycle, feed gas mixture enters center zone 111 of reactor 105 and is split into two part-streams. A first part-stream which constitutes at least about 50%, preferably about 75-85%, of the flow of feed gas mixture introduced into center zone 111, is heated by heat exchange material layer 112c, reacted in catalyst layer 112b and after passing through heat exchange layer 112a and distribution/collection zone 113 is delivered to a recipient (not shown) via lines 114, 116 and 118. The other part-stream which constitutes the remainder of the flow of feed gas mixture introduced into center zone 111 is heated by heat exchange material layer 110c, reacted in catalyst layer 110b and after passing through heat exchange material layer 110a displaces unreacted feed gas trapped in distribution/collection zone 109. Displaced unreacted feed gas is combined with feed gas mixture in line 102 via valve 120 and line 125. At this point, distribution/collection zone 109 is purged of unreacted feed gas; reacted gas occupies both distribution/collection zones 109 and 113 and the flow of feed gas mixture through the reaction can be reversed without discharging unreacted feed gas mixture to the recipient.

In the third phase, valve 120 is closed and three-way valves 104 and 115 are positioned to allow feed gas mixture from line 102 to enter heat exchange/reaction zone 110 via center zone 111 and reacted gas to be delivered to a recipient via lines 108, 116 and 118. Repositioning three-way valve 103 to divert feed gas mixture from line 121 to line 106 in the fourth phase allows feed gas mixture to enter reactor 105 via lines 106, 107 and 114 and results in a complete reversal of the flow of gas relative to the first phase of the process.

In the fifth phase, three-way valve 103 is positioned to allow feed gas mixture to enter center zone 111 and valve 122 is opened. The feed gas mixture is split into two part-streams and a first part-stream passes through and is reacted in heat exchange/reaction zone 110 and the reacted gas is delivered to a recipient (not shown) via lines 108, 116 and 118 and three-way valve 104. The other part-stream is heated by heat exchange material layer 112c, reacted in catalyst layer 112b and after passing through heat exchange material layer 112a displaces unreacted feed gas mixture trapped in distribution/collection zone 113. The displaced unreacted feed gas mixture is returned to line 102 via valve 122 and line 125 and combined with feed gas mixture being directed to reactor 105.

In the sixth phase, valve 122 is closed and three-way valves 104 and 115 are repositioned, thereby causing feed gas mixture delivered to center zone 111 to enter heat exchange/reaction zone 112 in which it is heated and reacted. Reacted gas is delivered to a recipient (not shown) via lines 114, 116 and 113. Repositioning three-way valve 103 to divert feed gas mixture from line 121 to line 106 returns the process to phase 1 of the cycle.

The position of the valves in each of the six phases of the process in this first alternative embodiment of the process of the present invention are summarized in Table II.

TABLE II

| PHASE | DESCRIPTION | VALVE NO | | | | | TIME |
|---|---|---|---|---|---|---|---|
| | | 103 | 104 | 115 | 120 | 122 | |
| 1 | Up Flow of Gas/no Purge | 0–106 | U | R | C | C | 2–30 min (typical) |
| 2 | Center Flow Up with Purge | 0–121 | U | R | O | C | 1–50% of phase 1 |
| 3 | Center Flow Down/no Purge | 0–121 | R | U | C | C | Valve Time +0.25 Sec. |
| 4 | Down Flow of Gas/no Purge | 0–106 | R | U | C | C | 2–30 min (typical) |
| 5 | Center Flow Down with Purge | 0–121 | R | U | C | O | 1–50% of phase 4 |
| 6 | Center Flow Up/no Purge | 0–121 | U | R | C | C | Valve Time +0.25 Sec. |

Figure 3:
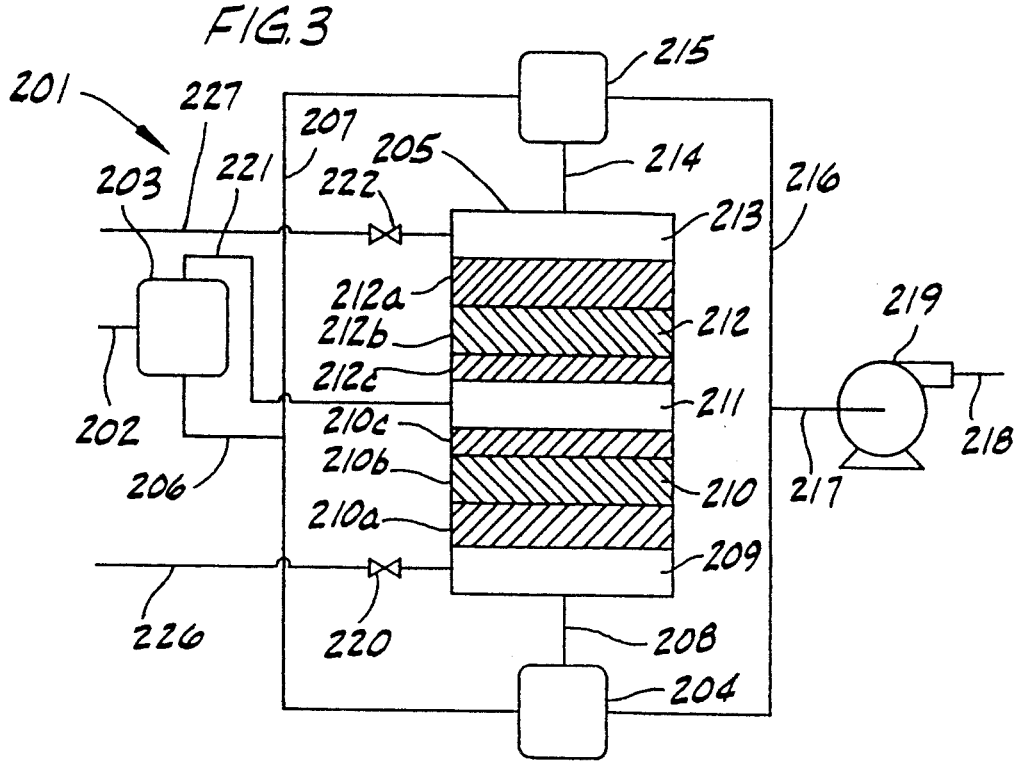
FIG. 3 schematically depicts a second alternative embodiment of the apparatus of the present invention.

0–106: Open to line 106
0–121: Open to line 121
U: Open on unreacted gas side
R: Open on reacted gas side
O: Open
C: Closed A second alternative embodiment of the apparatus and process of the present invention are schematically depicted in FIG. 3. Operation of this apparatus proceeds as described above for the apparatus depicted in FIG. 1A through 1F with the following exceptions. Instead of displacing unreacted feed gas mixture from distribution/collection zones 209 and 213 with reacted gas as is illustrated in FIGS. 1B and 1E, an inert pressurized purge gas such as air, carbon dioxide, or other gas free of contaminants is used. The purge gas enters distribution/collection zones 209 and 213 viat lines 226 and 227, respectively. Valves 220 and 222 are opened and closed as described for valves 20 and 22 of FIGS. 1A through 1F.

The position of the valves in each of the six phases of the process in the second alternative embodiment of the process of the present invention is summarized in Table III.

TABLE III

| PHASE | DESCRIPTION | VALVE NO | | | | | TIME |
|---|---|---|---|---|---|---|---|
| | | 203 | 204 | 215 | 220 | 222 | |
| 1 | Up Flow of Gas/no Purge | 0–206 | U | R | C | C | 2–30 min (typical) |
| 2 | Center Flow Up with Purge | 0–221 | U | R | O | C | 1–50% of phase 1 |
| 3 | Center Flow Down/no Purge | 0–221 | R | U | C | C | Valve Time +0.25 Sec. |
| 4 | Down Flow of Gas/no Purge | 0–206 | R | U | C | C | 2–30 min (typical) |
| 5 | Center Flow Down with Purge | 0–221 | R | U | C | O | 1–50% of phase 4 |

TABLE III-continued

| PHASE | DESCRIPTION | VALVE NO | | | | | TIME |
|---|---|---|---|---|---|---|---|
| | | 203 | 204 | 215 | 220 | 222 | |
| 6 | Center Flow Up/no Purge | 0-221 | U | R | C | C | Valve Time +0.25 Sec. |

Figure 4:
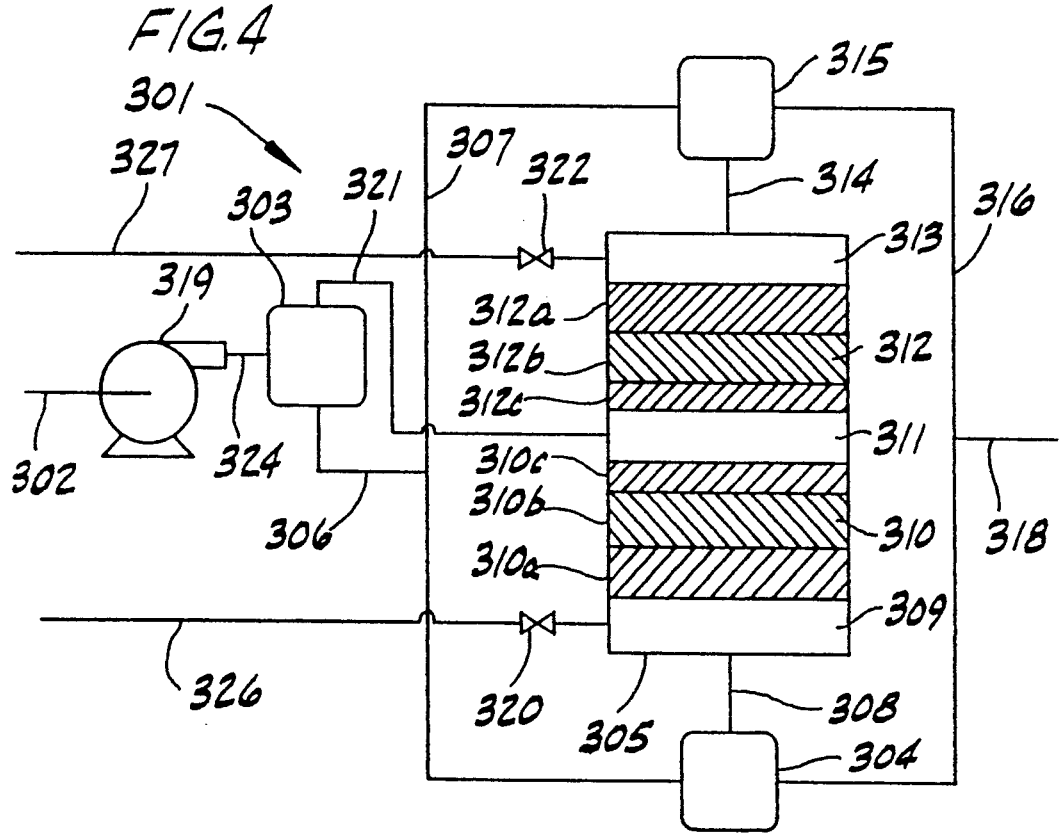
FIG. 4 schematically depicts a third alternative embodiment of the apparatus of the present invention.

0-206: Open to line 206
0-221: Open to line 221
U: Open on unreacted gas side
R: Open on reacted gas side
O: Open
C: Closed
Cycle = 2 min. to 60 min. (most common)
*1%-50% of Cycle A third alternative embodiment of the apparatus and process of the present invention is schematically depicted in FIG. 4. Operation of this apparatus proceeds as described above for the apparatus depicted in FIG. 3 except that blower 319 is upstream of reactor 305 in this embodiment whereas blower 219 is downstream of reactor 205 in the embodiment depicted in FIG. 3.

Figure 6:
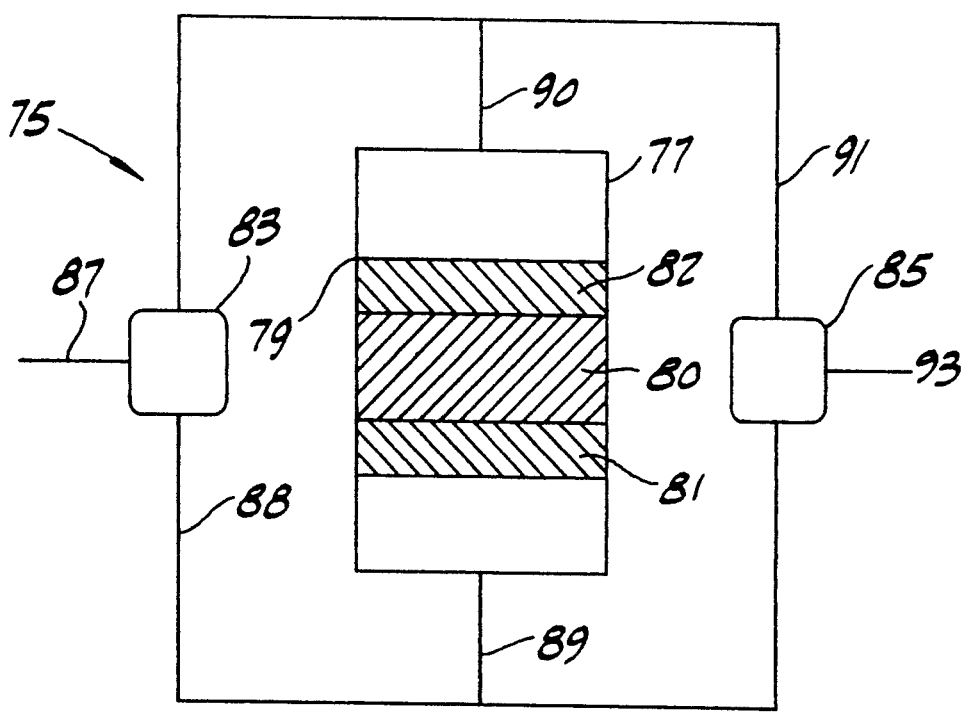
FIG. 6 schematically depicts a prior art apparatus as described in the Example.

The position of the valves in each of the six phases of the process in the third alternative embodiment of the process of the present invention is summarized in Table IV.

numeral 75 in FIG. 6. Prior art apparatus 75 comprises reactor 77 having heat exchange/reaction zone 79, three-way valves 83 and 85 and lines 87, 88, 89, 90, 91 and 93.

Heat exchange/reaction zone 79 contains catalyst layer 80 and inert heat exchange material layers 81 and 82. The prior art process comprises two phases. In the upflow phase, feed gas enters reactor 77 via lines 87, 88 and 89, is heated in inert heat exchange material layer 81 and reacted in catalyst layer 80. Reacted gas transfers its heat to inert heat exchange material layer 82 and is

TABLE IV

| PHASE | DESCRIPTION | VALVE NO | | | | | TIME |
|---|---|---|---|---|---|---|---|
| | | 303 | 304 | 315 | 320 | 322 | |
| 1 | Up Flow of Gas/no Purge | 0-306 | U | R | C | C | 2-30 min (typical) |
| 2 | Center Flow Up with Purge | 0-321 | U | R | O | C | 1-50% of phase 1 |
| 3 | Center Flow Down/no Purge | 0-321 | R | U | C | C | Valve Time +0.25 Sec. |
| 4 | Down Flow of Gas/no Purge | 0-306 | R | U | C | C | 2-30 min (typical) |
| 5 | Center Flow Down with Purge | 0-321 | R | U | C | O | 1-50% of phase 4 |
| 6 | Center Flow Up/no Purge | 0-321 | U | R | C | C | Valve Time +0.25 Sec. |

Figure 5:
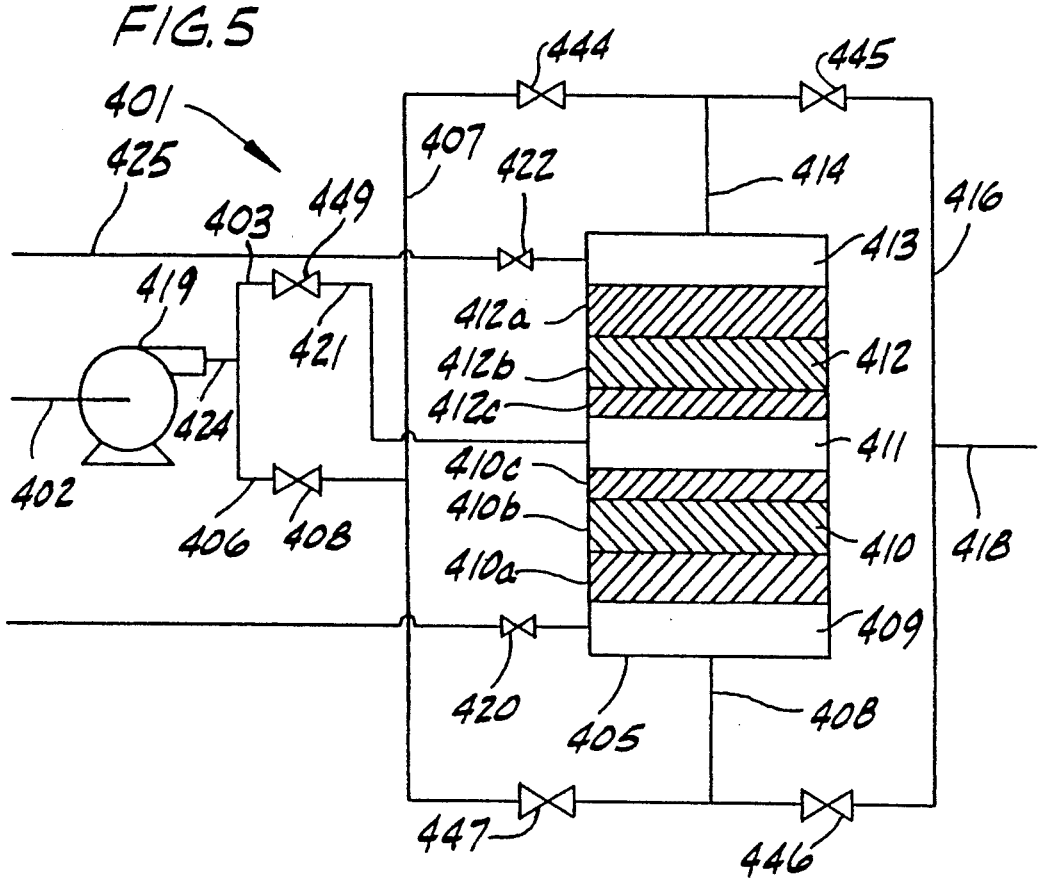
FIG. 5 schematically depicts a fourth alternative embodiment of the apparatus of the present invention.

0-306: Open to line 306
0-321: Open to line 321
U: Open on unreacted gas side
R: Open on reacted gas side
O: Open
C: Closed
Cycle = 2 min. to 60 min. (most common)
*1%-50% of Cycle A fourth alternative embodiment of the present invention is schematically depicted in FIG. 5. Operation of this apparatus proceeds as described above for the apparatus depicted in FIG. 2 except that 2 two-way valves have been substituted for each of the three-way valves. Each pair of two valves operate simultaneously where one closes and the second opens and vice versa. The position of the valves in each of the six phases of the process in the fourth alternative embodiment of the process of the present invention is summarized in Table V.

discharged to a recipient via lines 90, 91 and 93. In the downflow phase, feed gas enters reactor 77 via lines 87, 88 and 90, is heated in inert heat exchange material layer 82 and reacted in catalyst layer 80. Reacted gas transfers its heat to inert heat exchange material layer 81 and is discharged to a recipient via lines 89, 91 and 93. The comparison between the prior art process and apparatus and the process and apparatus of the present invention was based upon the purification of 300 Nm$^3$/hr of exhaust gas containing 1-20 grams of ethanol per Nm$^3$, at ambient temperature and pressure. Each reactor has an

TABLE V

| PHASE | DESCRIPTION | VALVE NO | | | | | | | TIME |
|---|---|---|---|---|---|---|---|---|---|
| | | 420 | 422 | 444 | 445 | 446 | 447 | 448 | 449 | |
| 1 | Up Flow of Gas/no Purge | C | C | C | O | C | O | O | C | 2-30 min (typical) |
| 2 | Center Flow Up with Purge | O | C | C | O | C | O | C | O | 1-50% of phase 1 |
| 3 | Center Flow Down/no Purge | C | C | O | C | O | C | C | O | Valve Time +0.25 Sec. |
| 4 | Down Flow of Gas/no Purge | C | C | O | C | O | C | O | C | 2-30 min (typical) |
| 5 | Center Flow Down with Purge | C | O | O | C | O | C | C | O | 1-50% of phase 4 |
| 6 | Center Flow Up/no Purge | C | C | C | O | C | O | C | O | Valve Time +0.25 Sec. |

O: Open
C: Closed

The following example illustrates the invention.

EXAMPLE

Using a mathematical model, a comparison was made between the process and apparatus of the present invention (see FIGS. 1A-1F and Table I) and a prior art process and apparatus, generally depicted by reference inner diameter of 0.53M and a height of approximately 5 meters. Each reactor contains 185 kg of heat exchange material and 145 kg of oxidation catalyst. Both are in the form of Rachig rings, 15 mm long by 15 mm external diameter by 9 mm internal diameter. The heat exchange material and catalyst are divided into two layers of the same size, separated by a space. The results for the prior art process and apparatus are presented in Table VI and the results for the process and apparatus of the present invention are presented in Table VII.

When the flow of gas through the prior art apparatus is reversed, a volume of unreacted gas mixture is trapped in the feed end of the reactor when it is switched to the reacted gas end. This volume of trapped feed gas mixture plus a volume of gas which passes through valve 83 or valve 85 in the time it takes for the valves to switch positions escapes into the reacted gas.

In the process and apparatus of the present invention, for a small fraction of time feed gas mixture passes through only half of the reactor beds resulting in a small loss of conversion which is proportionate to the fraction of time that feed to the center zone takes place. The reaction system was designed to provide 97% of the total oxidation of the ethanol as it passed through the first half of the reactor, the fraction of recycle was set at 30%, and the time of purging was set to flush three volumes of gas from distribution/collection zones 9 and 13 and the connecting pipelines to these zones; the purge time is that period of time in which valve 20 or valve 22 is open.

In Tables VI and VII, "Organic Carbon" denotes organic carbon, either as ethanol or some other molecule resulting from the initial stages of decomposition of the ethanol. In Table VI, this amount is calculated from the volume of unreacted feed gas mixture that is displaced from the reactor through valve B during the switching operation, as described above. The column entitled "Half Cycle, min" identifies the amount of time that has lapsed between the start of flow in one direction and the start of flow in the opposite direction through the reactor.

TABLE VI

| Example No. | X1 Feed Gas Ethanol (gm/Nm3) | t1 Half Cycle Min | X2 Outlet Gas Organic Carbon (mg/Nm3) | % Loss Calc. |
| --- | --- | --- | --- | --- |
| 1 | 1.0 | 5 | 11.5 | 2.21 |
| 2 | 1.0 | 10 | 5.8 | 1.10 |
| 3 | 5.0 | 5 | 57.5 | 2.21 |
| 4 | 5.0 | 10 | 28.8 | 1.10 |
| 5 | 20.0 | 5 | 230.2 | 2.21 |
| 6 | 20.0 | 10 | 115.1 | 1.10 |

TABLE VII

| Example No. | X1 Feed Gas Ethanol (gm/Nm3) | t1 Half Cycle Min | t2 Purging Time Sec | X2 Outlet Gas Organic Carbon (mg/Nm3) | % Loss Calc. |
| --- | --- | --- | --- | --- | --- |
| 10 | 1.0 | 5 | 35 | 2.5 | 0.47 |
| 11 | 1.0 | 10 | 35 | 1.2 | 0.24 |
| 12 | 5.0 | 5 | 35 | 12.3 | 0.47 |
| 13 | 5.0 | 10 | 35 | 6.2 | 0.24 |
| 14 | 20.0 | 5 | 35 | 49.1 | 0.47 |
| 15 | 20.0 | 10 | 35 | 24.6 | 0.24 |

In view of the above, it will be seen that the several objects of the invention are achieved.

As various changes could be made in the above processes and apparatus without departing from the scope of the invention, it is intended that all matter contained in the above description be interpreted as illustrative and not in a limiting sense.

We claim:

1. A process for the catalytic gaseous phase reaction of a feed gas mixture in a regenerative heat transfer reactor in which heat is recovered from reacted gas by regenerative heat exchange and used to heat feed gas mixture entering the reactor, said reactor having two ends which alternately serve as an inlet for the feed gas mixture and as an outlet for reacted gas, two stationary heat exchange/reaction zones which comprise catalyst, a center zone having an inlet for the feed gas mixture, the center zone connecting the two stationary heat exchange/reaction zones, a first distribution/collection zone between one of the heat exchange/reaction zones and one of the ends of the reactor and a second distribution/collection zone between the other heat exchange/reaction zone and the other end of the reactor, the process comprising introducing feed gas mixture into one of said ends of the reactor and passing the feed gas through one of said heat exchange/reaction zones to transfer heat stored in said one heat exchange/reaction zone to the feed gas introduced into the reactor and thereby cool said one heat exchange/reaction zone, catalytically reacting the feed gas, passing reacted gas through the other of said heat exchange/reaction zones to transfer heat from the reacted gas to said other heat exchange/reaction zone and thereby heat said other heat exchange/reaction zone, discharging reacted gas from the other of said ends of the reactor, periodically reversing the direction of flow of gas through said reactor in a continuing series of cycles by introducing feed gas mixture into said other end of the reactor so that heat that has been transferred from the reacted gas to said other heat exchange/reaction zone is transferred to the feed gas mixture introduced into the reactor, and as an intermediate step in each complete reversal of the direction of flow of gas through the reactor, introducing the feed gas mixture into the center zone, reacting the feed gas in the heat exchange/reaction zone which was being heated immediately prior to the intermediate step, discharging reacted gas from the end of the reactor which served as the reacted gas outlet immediately prior to the intermediate step, purging unreacted feed gas from the distribution/collection zone between the heat exchange/reaction zone which was being cooled and the end of the reactor which served as the feed gas mixture inlet immediately prior to the intermediate step, and combining the purged unreacted feed gas with feed gas mixture being introduced into the reactor.

2. The process of claim 1 wherein one complete cycle of the process consumes between about 0.8 to 100 minutes.

3. The process of claim 1 wherein a pressurized purge gas is used to purge the unreacted feed gas during the intermediate step.

4. The process of claim 1 wherein a fraction of the flow of reacted gas discharged from the reactor is diverted back to the reactor during said intermediate step and the diverted reacted gas is used to purge the unreacted feed gas.

5. The process of claim 1 wherein the purged unreacted feed gas is combined with feed gas mixture in the center zone of the reactor.

6. The process of claim 5 wherein a fraction of the flow of reacted gas discharged from the reactor is used to purge the unreacted feed gas during the intermediate step.

7. The process of claim 5 wherein a pressurized purge gas is used to purge unreacted feed gas during the intermediate step.

8. The process of claim 1 wherein the purged unreacted feed gas is combined with feed gas mixture outside the reactor.

9. The process of claim 8 wherein a fraction of the flow of reacted gas discharged from the reactor is used to purge the unreacted feed gas during the intermediate step.

10. The process of claim 8 wherein a pressurized purge gas is used to purge unreacted feed gas during the intermediate step.

11. The process of claim 1 wherein the feed gas mixture contains a reactant pair selected from the group consisting of: oxygen and a volatile organic compound; sulphur dioxide and oxygen; $H_2$ and $N_2$; methane and water; $H_2S$ and $SO_2$; hydrogen and carbon oxides; or ammonia and $NO_x$.

12. The process of claim 1 wherein the feed gas mixture contains oxygen and a volatile organic compound.

13. The process of claim 1 wherein the direction of flow of feed gas through the reactor is partially reversed during the intermediate step.

14. An apparatus for the catalytic gaseous phase reaction of a feed gas mixture comprising a reactor having two ends, two stationary heat exchange/reaction zones comprising catalyst, a center zone connecting the two stationary heat exchange/reaction zones, a first distribution/collection zone between one of the heat exchange/reaction zones and one of the ends of the reactor, a second distribution/collection zone between the other heat exchange/reaction zone and the other end of the reactor, means for periodically reversing the direction of flow of gas through said reactor so that each end thereof alternately serves as an inlet for the feed gas mixture and as an outlet for reacted gas, means for introducing said feed gas mixture into said center zone during an intermediate step in reversing the direction of gas flow through the reactor, and means for purging unreacted feed gas mixture from one of said distribution/collection zones during said intermediate step in which said feed gas mixture is being introduced into said center zone and reacted gas is exiting the reactor through the other of said distribution/collection zones.

15. The apparatus of claim 14 wherein the apparatus additionally comprises a blower which is upstream of the reactor relative to the flow of feed gas mixture to the reactor.

16. The apparatus of claim 14 wherein the apparatus additionally comprises a blower which is downstream of the reactor relative to the flow of reacted gas exiting the reactor.

17. The apparatus of claim 14 wherein each of the heat exchange/reaction zones comprises a layer of catalyst and a layer of inert heat exchange material.

18. The apparatus of claim 14 wherein each of the heat exchange/reaction zones comprises a layer of catalyst between two layers of inert heat exchange material.

* * * * *